United States Patent
Singamsetty et al.

(10) Patent No.: US 10,414,182 B2
(45) Date of Patent: Sep. 17, 2019

(54) MEDIA PRINT CONFIGURATION

(71) Applicant: HEWLETT-PACKARD DEVELOPMENT COMPANY, L.P., Houston, TX (US)

(72) Inventors: Sai Krishna Singamsetty, Bangalore (IN); Bindu Shivappa, Barcelona (IN); Laura Sanchez Domingo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/327,935

(22) PCT Filed: Feb. 5, 2015

(86) PCT No.: PCT/US2015/014662
§ 371 (c)(1),
(2) Date: Jan. 20, 2017

(87) PCT Pub. No.: WO2016/018460
PCT Pub. Date: Feb. 4, 2016

(65) Prior Publication Data
US 2017/0197449 A1    Jul. 13, 2017

(30) Foreign Application Priority Data
Jul. 28, 2014  (IN) ........................... 3665/CHE/2014

(51) Int. Cl.
*G06F 3/12*   (2006.01)
*B41J 29/393* (2006.01)
*B41J 2/01*   (2006.01)

(52) U.S. Cl.
CPC ............... *B41J 29/393* (2013.01); *B41J 2/01* (2013.01); *G06F 3/1205* (2013.01);
(Continued)

(58) Field of Classification Search
None
See application file for complete search history.

(56) References Cited

U.S. PATENT DOCUMENTS

| | | |
|---|---|---|
| 6,752,082 B2 | 6/2004 | Derhak et al. |
| 7,068,380 B2 * | 6/2006 | Milton ................... G06K 15/02 358/1.13 |

(Continued)

FOREIGN PATENT DOCUMENTS

WO    WO 0219261    3/2002

OTHER PUBLICATIONS

Schewe, J., Jeff Schewe on Making a Digital Print, (Web Page), Aug. 19, 2013.

*Primary Examiner* — Dung D Tran
(74) *Attorney, Agent, or Firm* — HP Inc. Patent Department

(57) ABSTRACT

Certain methods and systems for configuring a print device are described. In one example, a system comprises a print control interface that is arranged to receive a command from a remote client interface. The command may be generated based on a request to configure the print device that is received at the remote client interface from a printing application, the request being to implement a custom media profile for the print medium. The print control interface is operable to generate an operating profile for the print device based on the received request to print on the print medium. This allows printing on custom print media.

14 Claims, 4 Drawing Sheets

(52) U.S. Cl.
CPC .......... *G06F 3/1257* (2013.01); *G06F 3/1285* (2013.01); *B41J 2029/3937* (2013.01)

(56) References Cited

U.S. PATENT DOCUMENTS

| | | | |
|---|---|---|---|
| 7,278,702 B2 | 10/2007 | Silverbrook | |
| 7,280,242 B2 | 10/2007 | Hobbs | |
| 7,701,606 B2 | 4/2010 | Lee | |
| 7,798,590 B2 | 9/2010 | Snyder | |
| 8,559,058 B2* | 10/2013 | Shibuya | H04N 1/6097 358/1.9 |
| 8,599,391 B2 | 12/2013 | Takahashi | |
| 8,610,932 B2 | 12/2013 | Niles et al. | |
| 8,610,952 B2* | 12/2013 | Fukuda | H04N 1/6033 358/1.1 |
| 8,743,407 B2* | 6/2014 | Shinchi | H04N 1/6097 358/1.15 |
| 9,094,646 B2* | 7/2015 | Hamada | H04N 1/603 |
| 2003/0117639 A1* | 6/2003 | Milton | G06K 15/02 358/1.13 |
| 2004/0008365 A1* | 1/2004 | Hobbs | G06F 3/1205 358/1.15 |
| 2004/0021879 A1 | 2/2004 | Castelltort et al. | |
| 2010/0092201 A1* | 4/2010 | Kielland | B41J 29/393 |
| 2013/0314740 A1* | 11/2013 | Benedicto | G06F 3/1285 358/1.15 |
| 2015/0363145 A1* | 12/2015 | Kielland | B41J 29/393 358/1.6 |

\* cited by examiner

MEDIA PRINT CONFIGURATION

BACKGROUND

Printing systems may provide a number of distinct media profiles corresponding to different media types that a print device is configured to handle. These print devices may be, for example, large format printers, such as those used in technical, graphical and industrial fields. Media profiles specify properties relating to a particular media type. These media types may include roll media, sheet media and non-paper media such as glass, for instance. A user may be enabled to select a media profile from a set of media profiles that corresponds to a media type to be printed on. For example, this may be performed via a front panel of the print device or via a printer driver. The printing system may then implement a set of mechanical and/or electro-mechanical operating parameters for the print device that are associated with the media profile. For example, each media profile may be carefully programmed and calibrated by a printing device manufacturer and supplied as part of a printing device firmware. This may be performed in collaboration with a media manufacturer.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
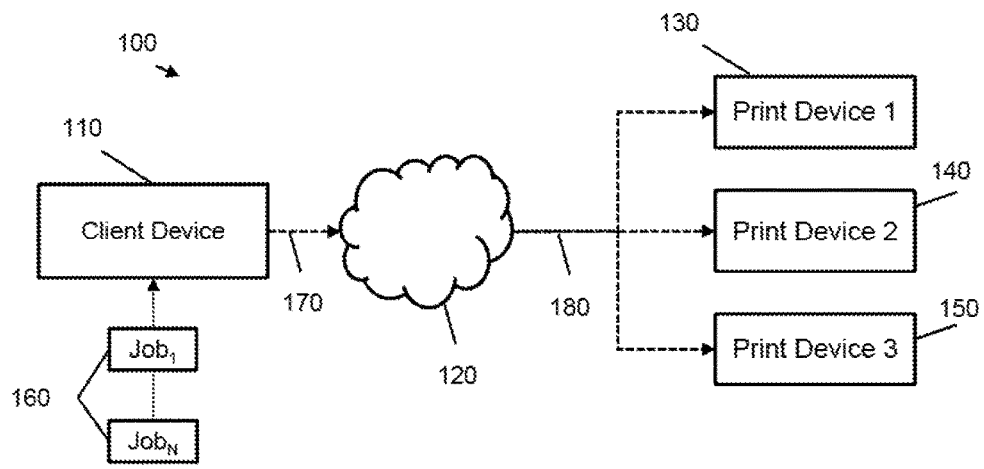
FIG. 1 is a schematic illustration showing an interaction between a client device, a server and a number of print devices according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to configuring a print device to print on media types that are not supported by native media profiles. Certain examples allow a print device to receive a request from a remote client device to configure the print device to print on a media type that does not have an appropriate media profile that is accessible to the print device. For example, the request may relate to custom property values that are not found in media profiles stored in the firmware of the print device. These property values may be media properties and/or printing-system specific properties. These custom media property values may relate to a particular print medium that does not have a media profile stored in the firmware. In these cases, an interface of the print device may be arranged to process any command arising from the request and instruct a print controller to modify one or more values for one or more operating parameters. This modification may comprise generating a bespoke operating profile that allows the print device to print on the particular print medium at a high quality.

In certain examples described herein, one or more media properties may be used to characterize a media type. These media properties may include substrate-specific properties such as substrate material, substrate weight, substrate density, ink absorption properties and reflectivity properties. A media type may also be associated with printing-system specific properties. For example, these may include color profiles (for example, color profiles according to an international color standard such as the International Color Consortium) which are compatible with the printing system and a printing resolution appropriate for use with that media type. Operating parameters may include, amongst others, one or more mechanical and electromechanical properties of a print device such as the rate of firing of ink-nozzles, control of ink release on the media, control of cartridge and media transport units, vacuum settings, inter swath delay, and bow compensation.

In a comparative case, properties associated with a media type may be determined by a print device manufacturer and used to set a media profile that is stored in firmware for the print device. For example, a number of operating parameters of the printer may be associated with a media profile for a particular type of A4 paper that is loaded into print-device firmware during manufacture of the print device. In these cases a printing system may provide a user interface such as a front panel that allows a user to select a pre-programmed media profile for a print job. Consequently, when a user wishes to add media types that are not pre-programmed, e.g. if a new category of media becomes available, it may be necessary to either perform a firmware upgrade on the print device or to use whichever existing media profile best matches the new media type. A firmware upgrade may be cumbersome and may require the user to contact the print device manufacturer and request a firmware upgrade for the media type they wish to print on. The latter option may result in a compromise on printing quality; there is a mismatch between the pre-programmed configuration and the new media type.

Certain methods and systems described herein enable customizability of media profiles based on a request from a client-side interface, to suit a media type. For example, certain examples allow custom media types to be programmed from a Raster Image Processing (RIP) application. The RIP application may be processed on a computing device that is remote from the print device, e.g. which is communicatively coupled over a local or wide-area network. In particular, certain methods and systems described herein give a user control over a media profile, and consequently minimize a loss of quality due to a pre-programmed media profile being inappropriate for the media type being used in print.

FIG. 1 shows an arrangement 100 for instructing a print according to an example. The arrangement 100 comprises a client device 110, a network 120 and a plurality of print devices 130, 140 and 150. The client device 110 is arranged to receive one or more print jobs 160. A print job 160 may comprise a number of data files to be printed together with requirements for the print, such as a requested print media. A data file may include any combination of, amongst others, text, graphics and photographs. The data may be in a vector format. Each data file may provide data in a page description language such as PostScript, Portable Document Format (PDF), eXtended Markup Language (XML) Paper Specification or as an image file of a higher or lower resolution. According to one example, the client device 110 accesses an image processing application in the form of a RIP application. The RIP application may be processed locally by the client device 110 and/or accessed via the network 120, e.g. be a hosted service accessible via a web browser. A RIP application may be arranged to generate a raster image for printing from one or more input data files received with a print job 160. Example RIP applications are manufactured by, amongst others, Onyx®, Caldera® and colorGATE®. The RIP application processes data associated with the print jobs 160 and outputs data to be sent to one or more of the print device 130, 140 and 150. The client device 110 is arranged to send data to the network 120 via communications channel 170. Client device 110 may be a mobile or desktop device not physically located with print devices 130, 140 and 150, and the connection 170 may be a wired and/or wireless network connection. The network 120 may comprise one or more intermediate computing devices arranged to process and/or route data.

The network 120 communicatively couples the client device 110 with the RIP application and the one or more print devices 130, 140 and 150. Print devices 130, 140 and 150 may be of the same or a different type. They may or may not be located physically with the client device 110; however, they are remote from the client device 110 in that they are independent and communicatively coupled. In one example, one print device may be located near the client device to allow for quality inspection of resulting prints, while other print devices are located at physically remote locations. Consequently the connection 180 may comprise both wired and wireless elements between network 120 and print devices 130, 140, 150. In one case, at least a portion of the network may comprise the Internet, in which case the client device 110 and the print devices 130, 140, 150 may communicate using an Internet protocol suite including the Transmission Control Protocol (TCP) and the Internet Protocol (IP), i.e. TCP/IP. The protocols used for communication may depend on the implementation; for example, in another example communication may be performed using the User Datagram Protocol—e.g. UDP/IP. According to one example, print devices 130, 140, 150 may be large format ink-jet printers for use in the digital printing industry. Print devices 130, 140, 150 may be printers adapted for printing on a wide variety of media, such as paper, plastic, cloth, wood or glass, for instance. In yet further examples print devices 130, 140, 150 may comprise one or more of virtual, personal or industrial printers. The print devices 130, 140, 150 are arranged to receive print data from the RIP application by way of the network 120.

For large format printing applications, a print job 160 may be received from a user of a print service provider. The user may provide one or more of job details, color and media specifications and required print timescales. The client device 110 may be operated by an image processing engineer. The image processing engineer uses the client device 110 to generate print data to be sent to one or more of the print devices 130, 140, 150. In the present example, the image processing engineer may use an image processing application, such as a RIP application, to process the job details and determine if a custom media profile is required. For example, it may be determined whether one or more of the color and media specifications from the user can be met using one or more pre-programmed media profiles accessible to each print device. If it is determined that one or more of the color and media specifications cannot be met using one or more pre-programmed media profiles, e.g. a required color and/or media type is not natively supported by a print device, then the image processing engineer may use a system according to examples described herein to create a custom media type that is used to instruct the printing of the print job on one of the print devices.

Figure 2:
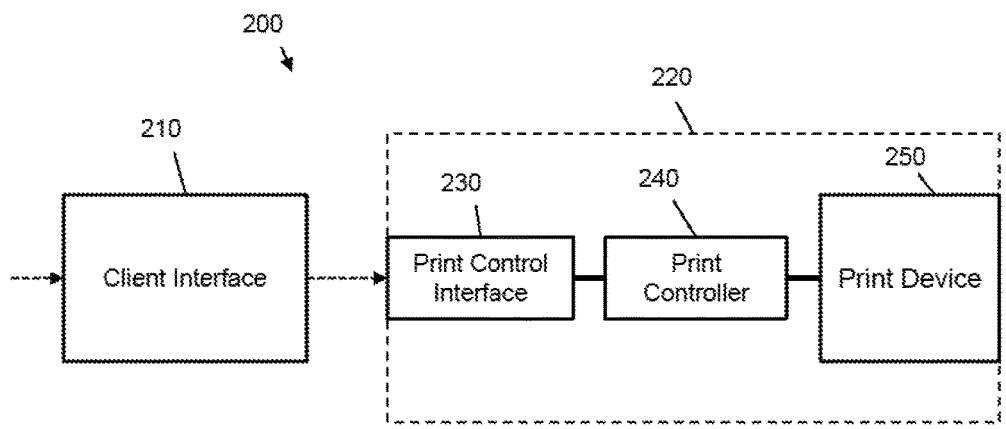
FIG. 2 is a schematic diagram showing client and print-control interfaces according to an example.
Figure 3:
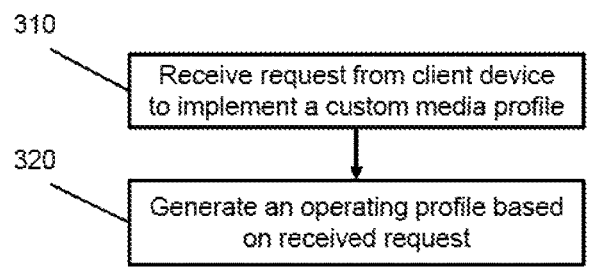
FIG. 3 is a flowchart showing a method of generating an operating profile based on a request from a client device to implement a custom media profile according to an example.

FIG. 2 shows a system 200 that enables a custom media type to be used in a print operation according to an example. The system comprises a client interface 210 in communication with a printing system 220. In relation to FIG. 1, the client interface 210 may form part of the client device 110. In one case the client interface 210 is an interface between a RIP application and the printing system 220. In this case, if the RIP application is hosted in the network 120 then the client interface 210 may encompass the communications between client device 110 accessing the RIP application and a RIP server located in the network 120. The client interface 210, and/or the communication channel between the client interface 210 and the printing system 220, may cover communication through communication channel 170 and communication via network 120 through channel 180. The printing system 220 of FIG. 2 comprises a print control interface 230, a print controller 240 and a print device 250. The printing system 220 may implement one or more of the print devices 130, 140, 150 shown in FIG. 1. In one case, the print control interface 230 and the print controller 240 may form part of the hardware of one or more of the print devices 130, 140, 150 shown in FIG. 1; in another case, the print control interface 230 and the print controller 240 may be external to one or more of the print devices 130, 140, 150, for example, may comprise hardware that is communicatively coupled to print device 250.

In FIG. 2, the client interface 210 is communicatively coupled to the print control interface 230 of the printing system 220. The print control interface 230 may be arranged to receive a command from the client interface 210. The command from the client interface 210 may be based on a request at the client interface 210 from a printing application, such as a RIP application, to configure the print device 250. The print control interface 230 may be communicatively coupled to the print controller 240 which may itself be communicatively coupled to the print device 250. The received command may be processed by the print control interface 230 and a signal containing instructions to modify one or more of the operating parameters may be communicated to the print controller 240. The print controller 240 may be arranged to effect a print operation according to an operating profile upon receiving instructions from the print control interface 230.

In one example, the client interface 210 comprises one or more components that enable a print job to be processed and a print application to interact with the print device 250. For example, these components may comprise tools to process and/or create a print job, tools to interact with and/or drive the print device 250 and/or one or more interfaces to work remotely with the print device 250, such as defined application programming interface (API) commands. Similarly, the print control interface 230 may be arranged to accept commands from the client interface 210 and instruct appropriate actions for the print controller 240 to perform. As well as, or instead of, a RIP application, the client interface 210 may provide an interface for one or more image processing tools that wish to instruct a print job on print system 220. One or more of the print control interface and the print controller 240 may be implemented by firmware installed on one of the print devices 130, 140, 150.

In one example, the client interface 210 of FIG. 2 is arranged to receive a request to create a new media type for printing without requiring a firmware upgrade for the printing system 220. To achieve this, the client interface 210 converts the request to one or more commands that are sent to the print control interface 230. These commands may indicate media properties and/or printing-system specific properties. For example, a command may indicate a substrate property (e.g. a weight of 100 grams per square meter (gsm) rather than 80 gsm), a request to use a custom ICC color profile and/or a request to use a particular paper mode. The command is received and processed by the print control interface 230, whereby the print control interface 230 extracts one or more values to be used to modify one or more operating parameters of the print device. In one case, the print control interface 230 instructs the print controller to set particular values of one or more operating parameters to effect a print run for a print job. As part of this process the print control interface 230 may create a custom media profile that is stored in a computer readable medium accessible to the print controller 240 such that the print controller is able to use the custom media profile on future print runs. Similarly, the print control interface 230 may be arranged to enable the modification and/or deletion of existing media profiles. This may be achieved remotely over the Internet, e.g. over a TCP or UDP/IP connection between the client interface 210 and the print control interface 230.

According to one example, the print control interface 230 is arranged to parse a received command and determine whether the command requires changes that fall within the parameter ranges of the print device 250. For example, different print devices may have different operational parameter ranges and adherence to these changes may be checked.

In one case, at least a portion of the print control interface 230 may comprise hardware components arranged to receive data packets over a set of Internet protocols and parse those packets to identify one or more commands received from the client interface 210. On receipt of one or more commands and any associated variables the print control interface 230 may be arranged to process, by way of a computer processor, one or more stored routines, e.g. as represented by computer program code stored in firmware of a print device.

FIGS. 3 to 7 show a number of example methods that may be used in conjunction with the systems portrayed in FIGS. 1 and 2. Starting with FIG. 3, this shows a method for generating an operating profile for a print device according to an example. In this case, an operating profile comprises indications of one or more operating parameter values that may be used to effect a print operation on a print device. At block 310, a request is received from a remote client device to implement a custom media profile. The request may be received at the print control interface 230 of FIG. 2. In one case, the remote client device may comprise the client device 110 of FIG. 1 that implements client interface 210. In another case, the remote client device may comprise a server communicatively coupled to a print device, e.g. a server hosting an image processing application that interacts with, or provides, client interface 210. The request may be received over a communications channel, such as a TCP/IP connection. The request indicates one or more settings for printing using a print device. The request may indicate one or more settings for printing that are not accommodated by one or more pre-programmed media profiles accessible to the print device.

At block 320, an operating profile is generated based on the received request. In one case, the generation of an operating profile may be carried out by a print control interface such as that shown at 230 in FIG. 2. In this case, the print control interface 230 carries out a mapping of the request to implement the custom media profile to a set of one or more parameters that configure the print device. Generation of an operating profile may comprise mapping one or more properties indicated in the request, such as color profile, paper weight and/or density, to specific operating parameters of the print device. The mapping may be one-to-one, many-to-one or one-to-many. Generating an operating profile may comprise generating a new media profile, wherein the new media profile instructs the print controller 240 of FIG. 2 to effect the operating profile. A new media profile may be stored in a computer readable storage medium accessible to the print controller, such as flash memory.

In one case, an operator of an image processing application may generate the request of block 310 by first selecting an identifier of an existing media type, e.g. a media type that has a pre-existing media profile accessible to the print device. In this case, a new paper mode may be defined by providing new paper mode parameters and/or by modifying the values of existing paper mode parameters. This may comprise providing one or more of: a paper mode name; a paper mode description; parameter values for media settings; parameter values for print device efficiency, ink density and/or ink carriage passes; and an ICC color profile for the paper mode. In this case, the image processing application is arranged to call a function defined as part of a client interface API with any supplied values. The client interface then arranges for a command associated with the called function to be sent to the print control interface and the print device, together with any supplied parameters and values. The print device may then validate the command and send a response indicating success or failure to the image processing application at block 320.

The commands that are receivable at block 310 may be, amongst others, one or more of: a command to create a new paper mode; a command to delete an existing paper mode; a command to set media properties of an identified print mode to their default values; a command to set media properties of an identified print mode to supplied values; a command to identify a color profile associated with a particular media and/or paper mode; a command to set a color profile associated with a particular media and/or paper mode; a command to delete a color profile associated with a particular media and/or paper mode; and a command to synchronize a print medium list between the image processing application and the print device.

Figure 4:
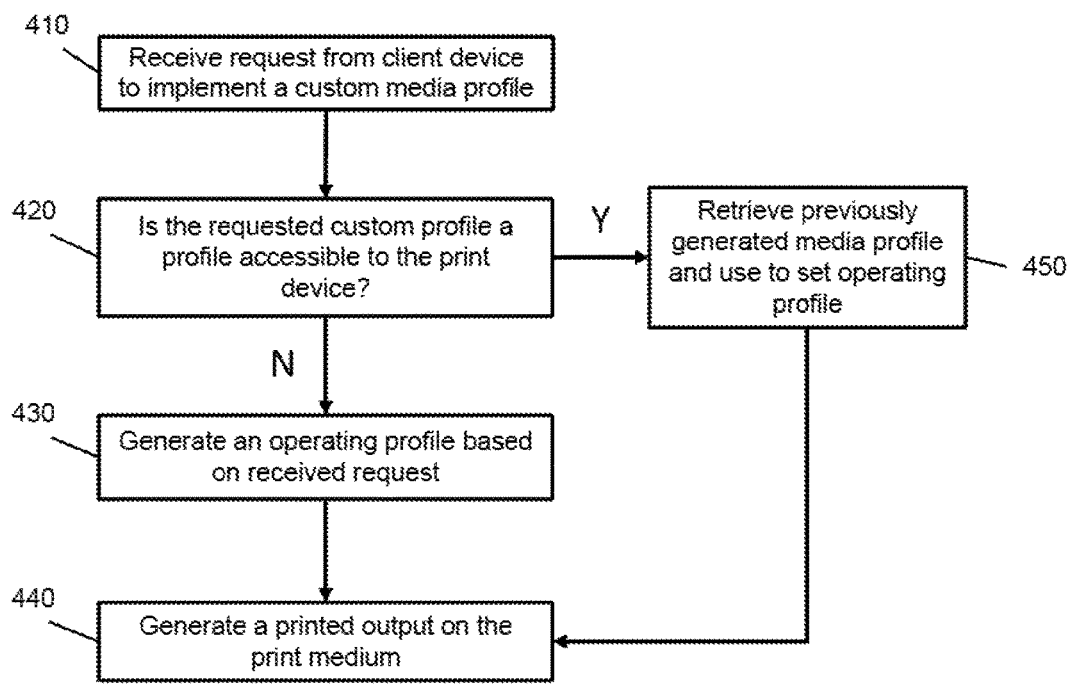
FIG. 4 is a flowchart showing a method of determining whether a custom media profile is accessible to a print device according to an example.

FIG. 4 depicts an example method of generating a printed output on a print medium where the print medium requires a custom media profile. The method shown in FIG. 4 may be executed on the systems depicted in FIGS. 1 and 2. At block 410, a request is received, at a printing system via an interface, to implement a custom media profile. This interface may be provided by the client interface 210 and print control interface 230 as coupled by a communication channel. At block 420, a determination is made as to whether the requested custom media profile has been previously implemented on the printing system. For example, this may comprise searching a set of accessible media profiles for settings that match the requested custom media profile. If a custom media profile matching the request is located then that profile is retrieved at block 450 and is used to set an operating profile for the print device, e.g. is used to effect a set of operating parameters to print a raster image. If a custom media profile matching the request is not located, e.g. is not accessible to the print device, an operating profile is generated based on the received request at block 430. As with the method of FIG. 3, this may be executed at a print control interface 230 as depicted in FIG. 2. In either case, any generated operating profile is used to set one or more operating parameters of the print device so as to generate a printed output on the print medium at block 440.

Figure 5:
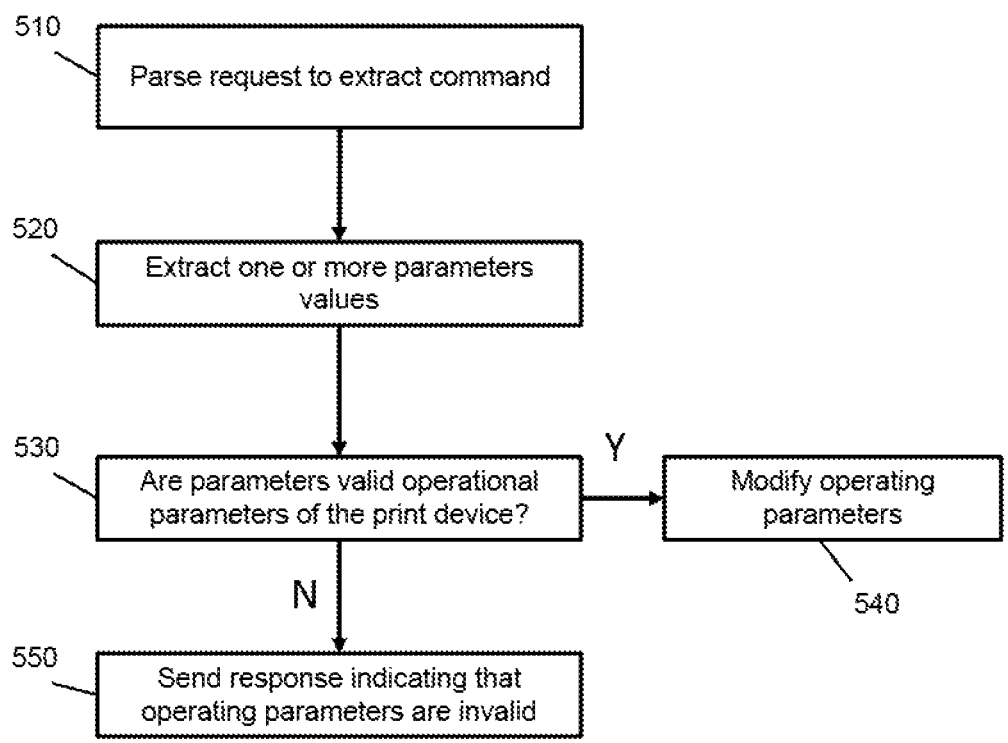
FIG. 5 is a flowchart showing a method to determine whether one or more operating parameters are valid according to an example.

FIG. 5 shows an example method that may be used by a printing system to determine whether one or more operating parameters are valid. The method may be applied after a request is received, e.g. at block 310 of FIG. 3. At block 510, the request is parsed to, extract one or more commands. At block 520, one or more associated operating parameter values associated with the one or more commands are extracted. For example, these may comprise values for media properties and/or printing-system specific properties. At block 530, a determination is made as to whether the operating parameters values are valid for the printing system. For example, a combination of the extracted command and/or values may instruct the use of a custom operating parameter value as part of an operating profile. However, the printing system may only be able to set values within a given range. Hence, at block 530 the received one or more values may be compared with one or more specified ranges, e.g. ranges pre-programmed in the firmware of a print device. If it is determined that the values are valid, the operating parameters are modified at block 540. If it is determined that the values are not valid, then an error response is sent. For example, the client interface 210 of FIG. 2 may be informed that the supplied request is invalid at block 550. If the print control interface 230 of FIG. 2 is being used, it may inform the client interface 210 which operating parameters are invalid, or further, which parameters extracted from the command at 510 have led to an invalid operating parameter.

Figure 6:
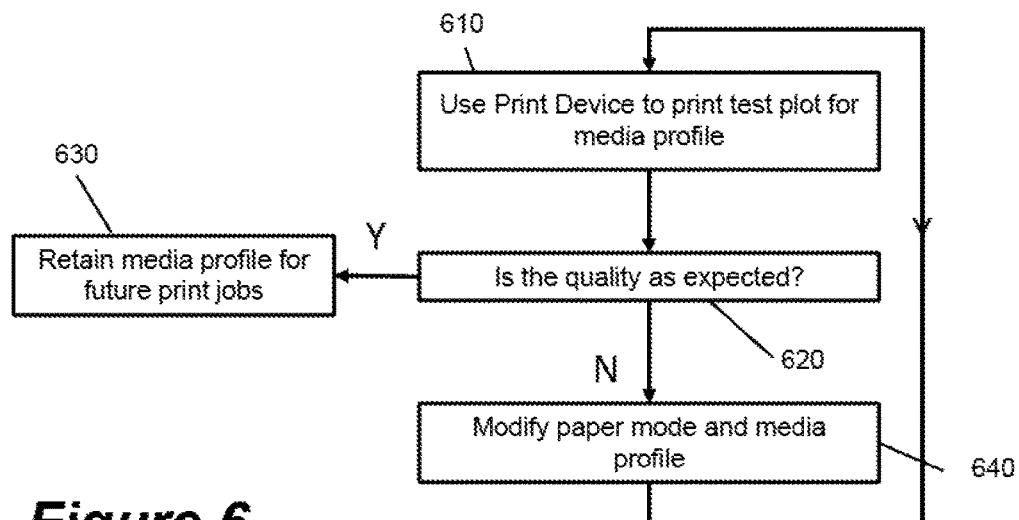
FIG. 6 is a flowchart showing a method to determine whether to retain a media profile based on one or more tests prints according to an example.

FIG. 6 shows a flow diagram of an example method that may be used to determine whether an instructed custom media profile is producing prints on the media to the desired quality. This method may be performed following block 440 of FIG. 4. At block 710, a test image is printed using the print device and a set of custom print settings, e.g. a set implemented by the operating profile of any of blocks 320, 430 and 450. This print may be performed on a test print device that is accessible to a client device such as 110 or a print device that is able to provide remote visual feedback on a test output. At block 730 a determination is made as to whether the print is of the desired quality. If this is the case the custom settings are retained for future use with that print device at block 630. This may comprise storing a custom media profile in a local or remote storage device that is accessible to the print device. If the print is not of the desired quality and/or throughput, then any custom settings for a new media type can be modified at block 740 and the process repeated. For example, an image processing engineer may change the values of the request sent via client interface 210 to the print control interface 230 and the blocks of FIG. 3 may be repeated. The method may be repeated any number of times. In certain cases, a test print may be measured and the measured values may be fed back to client device 110. These may be used to automate a correction to the requested parameter values. The method of FIG. 7 may also be carried out for different print devices, as a custom media profile may depend on the configurations of each individual print device.

Certain methods and systems described herein allow custom media types to be remotely set on a print device. This may be achieved without firmware upgrades and/or the need to clone media and manipulate values on a print device front panel. Certain examples allow users, such as image processing engineers, to create entirely new media in a selected target print device as and when it is required. This may be performed remotely based on the dynamic needs of a given print job. As such users have complete media flexibility for a print device and can generate any number or type of media profiles independent of any particular print device or print media manufacturer. Certain examples further enable increased quality, predictability, consistency, productivity and/or throughput as operating parameters for a print device may be matched with a media type. In particular, matching to a correct media type may improve quality and throughput, such as square meters of media processed by a print device in a unit time period having a predefined quality standard. This may be important when executing large print jobs. They also allow a greater media range, including increased support for non-standard media, e.g. a variety of paper, plastic media, cloth, wood, and glass media; entirely new media profiles may be created with custom calibration profiles, paper modes, print modes and media settings.

Certain methods and systems are suited to large format printing systems, though it should be understood that the methods and systems described herein are not limited to large format printing, for example they may be applied to any printing system that generates a print output on a variety of media. Large format printing systems may require, for example, 24-hour operation, high performance with respect to time and quality constraints, and cost effectiveness. By using bespoke media settings environmental performance can also be increased, e.g. wastage may be reduced based on poor quality media-operating parameter matches. Custom media settings also avow for a wide range of media processing accessories, e.g. duplexers, stackers and folders, which may be configured using the examples described herein. Greater integration with existing image processing applications is also possible. For example, remote calls on a given print devices print control interface also allows real-time media information updates to be fed back to image processing applications.

Certain examples described herein, provide an interface, which may be implemented by components of a development kit that allows an image processing application to access one or more of a set of parameters, settings and capabilities required to control a print output on a print device. The interface, which may be implemented as shown in FIG. 2, may provide an image processing application with a range of valid values for each parameter or setting. The client interface 210 and the image processing application may be arranged such that when a user selects a particular print device or print device model in the image processing application, the range of valid values is retrieved for that particular print device or print device model. In one case, selection of a print device may comprise communication between a client interface 210 and a print control interface 230 to retrieve the range of valid values for print device 250 and return these from the print control interface 230 to the client interface 210 and thus to the image processing application. The user of the image processing application may then set parameter values within a valid range for the selected print device or print device model; set parameter values then being sent to the print control interface 230 from the client interface 210 to create or modify a profile for a new media type.

Figure 7:
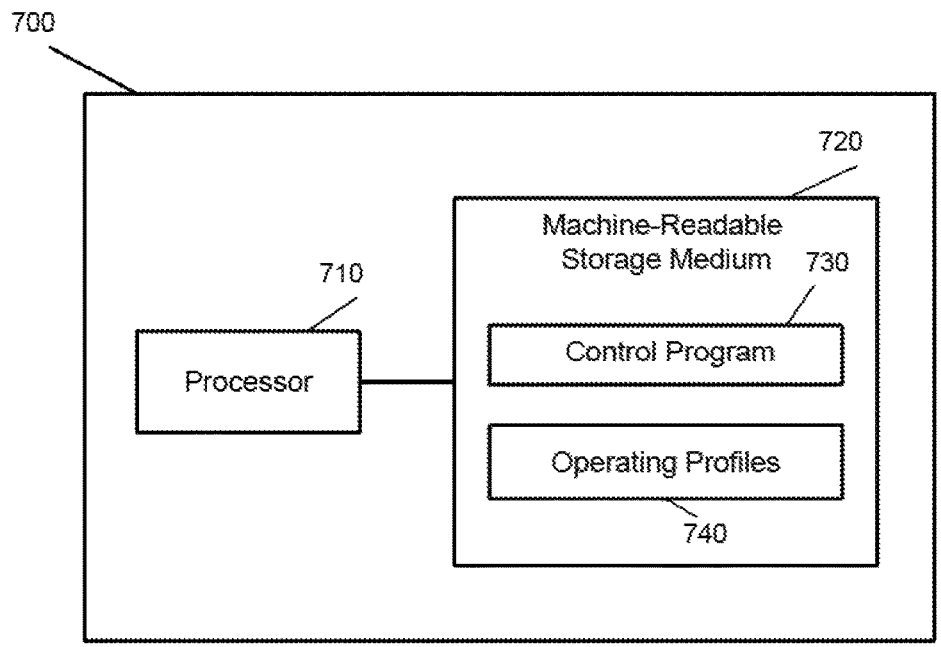
FIG. 7 is a schematic diagram showing a computer system according to an example.

Certain methods and systems as described herein may be implemented by a processor that processes program code that is retrieved from a non-transitory storage medium. FIG. 7 shows an example 700 of a device comprising a machine-readable storage medium 720 coupled to a processor 710. The device may comprise a computer and/or a print device. Machine-readable media 720 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 7, the machine-readable storage medium comprises a control program 730 which may be executed to implement one or more of the examples described herein. In certain cases one or more operating profiles 740 may also be stored on the machine readable storage medium 720.

Similarly, it should be understood that a print controller implementing control program 730 may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer program code stored in (non-transitory) memory and executable by the processor, or by hardware, or by a combination of tangibly stored code and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching.

The invention claimed is:

1. A method for configuring a print device comprising:
receiving, by the print device, a request from a remote client device to implement a custom media profile for a print medium, the request indicating a setting for printing using the print device;
generating, by the print device, an operating profile for the print device based on the received request, the operating profile implementing the setting on the print device, comprising:
parsing the request and extracting a value;
determining whether the value is valid for an operating parameter of the print device;
returning a response to the remote client device indicating success or failure of implementing the custom media profile indicated in the request;
in response to determining that the extracted value is valid,
changing the operating parameter to the extracted value to implement the custom operating profile; and
generating a printed output on the print medium for which the request to implement the custom medium profile was made, using the generated operating profile.

2. The method of claim 1, wherein the request to implement a custom media profile is for a profile not supported by a media profile accessible to the print device.

3. The method of claim 1, wherein the media profile comprises parameters for:
a color profile;
printer calibration properties;
print modes; and
paper modes.

4. The method of claim 1, wherein the request indicates a color profile to be used for the print operation.

5. The method of claim 1, wherein the operating parameter is selected from:
vacuum settings,
inter swath delay, and
bow compensation.

6. A non-transitory computer-readable storage medium storing instructions that, when executed by a processor, cause the processor to:
receive a request from a remote client device to implement a custom media profile for a print medium, the request indicating a setting for printing using the print device;
generate an operating profile for the print device based on the received request, the operating profile implementing the setting on the print device, by:
parsing the request and extracting a value;
determining whether the value is valid for an operating parameter of the print device;
returning a response to the remote client device indicating success or failure of implementing the custom media profile indicated in the request;
in response to determining that the extracted value is valid,
change the operating parameter to the extracted value to implement the custom operating profile; and
generate a printed output on the print medium for which the request to implement the custom medium profile was made, using the generated operating profile.

7. The non-transitory computer-readable storage medium of claim 6, wherein the request is to configure the print device to print on a print medium that does not have a media profile accessible to the print controller.

8. The non-transitory computer-readable storage medium of claim 6, wherein the request indicates a color profile to be used for the print operation.

9. The non-transitory computer-readable storage medium of claim 6, wherein the operating parameter is selected from:
vacuum settings,
inter swath delay, and
bow compensation.

10. A print device comprising:
a print control interface to:
receive a request from a remote client device to implement a custom media profile for a print medium, the request indicating a setting for printing using the print device;
generate an operating profile for the print device based on the received request, the operating profile implementing the setting on the print device, by:
parsing the request and extracting a value;

determining whether the value is valid for an operating parameter of the print device;

returning a response to the remote client device indicating success or failure of implementing the custom media profile indicated in the request; and a print controller to, in response to the extracted value being valid:

change the operating parameter to the extracted value to implement the custom operating profile; and generating a printed output on the print medium for which the request to implement the custom medium profile was made, using the generated operating profile.

11. The print device of claim 10, wherein the request is to configure the print device to print on a print medium that does not have a media profile accessible to the print controller.

12. The print device of claim 10, wherein the request indicates a color profile to be used for the print operation.

13. The print device of claim 10, wherein the operating parameter is selected from:

vacuum settings,
inter swath delay, and
bow compensation.

14. The print device of claim 10, wherein the print control interface is to receive a request, from the remote client device, for a print configuration of the print device and to, in response, send data indicative of a current value for the operating parameter.

* * * * *